(12) United States Patent
Grieshaber et al.

(10) Patent No.: US 7,887,071 B2
(45) Date of Patent: Feb. 15, 2011

(54) ACTIVE, DIVIDED MOTOR VEHICLE STABILIZER HAVING AN INCORPORATED PIVOT MOTOR

(75) Inventors: Martin Grieshaber, Munich (DE); Reinhard Simkovics, Freising (DE); Michael Spielmann, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/392,486

(22) Filed: Feb. 25, 2009

(65) Prior Publication Data

US 2009/0152824 A1    Jun. 18, 2009

Related U.S. Application Data

(63) Continuation of application No. PCT/EP2007/007005, filed on Aug. 8, 2007.

(30) Foreign Application Priority Data

Aug. 26, 2006   (DE) ................ 10 2006 040 109

(51) Int. Cl.
B60G 21/055 (2006.01)
(52) U.S. Cl. ............... 280/124.106; 280/5.502; 280/5.506
(58) Field of Classification Search .......... 280/124.106, 280/124.107, 5.502, 5.506
See application file for complete search history.

(56) References Cited

U.S. PATENT DOCUMENTS

| | | | |
|---|---|---|---|
| 6,425,585 B1 * | 7/2002 | Schuelke et al. | 280/5.511 |
| 2006/0116802 A1 * | 6/2006 | Yamada et al. | 701/37 |
| 2007/0119644 A1 * | 5/2007 | Yasui et al. | 180/183 |
| 2007/0290473 A1 * | 12/2007 | Buma | 280/124.106 |
| 2008/0100019 A1 | 5/2008 | Simkovics | |

FOREIGN PATENT DOCUMENTS

| | | |
|---|---|---|
| DE | 197 05 809 C2 | 2/1998 |
| DE | 198 46 275 A1 | 12/1999 |
| DE | 100 02 455 A1 | 7/2001 |
| DE | 10 2005 031 036 A1 | 1/2007 |
| DE | 10 2005 031 037 A1 | 1/2007 |

(Continued)

OTHER PUBLICATIONS

German Search Report dated Jun. 29, 2007 with English translation (nine (9) pages).

(Continued)

*Primary Examiner*—Paul N Dickson
*Assistant Examiner*—Timothy D Wilhelm
(74) *Attorney, Agent, or Firm*—Crowell & Moring LLP

(57) ABSTRACT

An active, divided stabilizer for a motor vehicle having an incorporated pivot motor is provided. The pivot motor is used for pivot regulation and includes at least one displacement drive having a motor and transmission, and a housing. At least one housing part is connected to an associated stabilizer part for torque transmission. The housing part has an axially oriented, central indentation, into which the stabilizer part extends. The connection for torque transmission between the housing part and the stabilizer part is located therein. A sensor for detecting the torsion angle of the stabilizer part is attached to the housing part, with a corresponding encoder is fixed on the stabilizer part, or vice versa.

8 Claims, 1 Drawing Sheet

FOREIGN PATENT DOCUMENTS

| | | |
|---|---|---|
| EP | 1 579 208 A1 | 9/2005 |
| EP | 1 627 757 A1 | 2/2006 |
| EP | 1 634 732 A1 | 3/2006 |
| EP | 1 679 208 A1 | 7/2006 |
| JP | 63-145118 A | 6/1988 |
| WO | WO 2004/061449 A1 | 7/2004 |
| WO | WO 2004/085179 A1 | 10/2004 |
| WO | WO 2005/077685 A1 | 8/2005 |
| WO | WO 2007/003279 A1 | 1/2007 |

OTHER PUBLICATIONS

International Search Report dated Nov. 7, 2007 with English translation (six (6) pages).

* cited by examiner

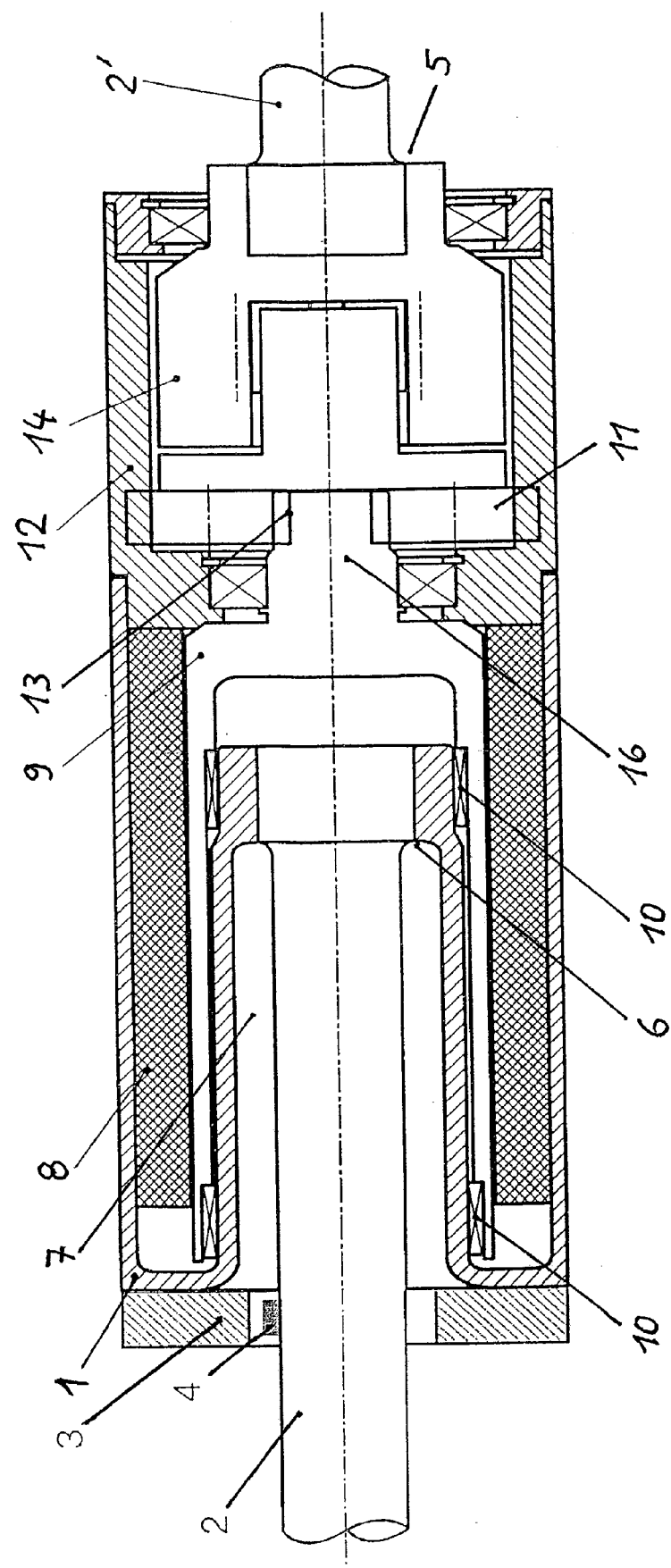

United States Patent US 7,887,071 B2

ACTIVE, DIVIDED MOTOR VEHICLE STABILIZER HAVING AN INCORPORATED PIVOT MOTOR

CROSS-REFERENCE TO RELATED APPLICATIONS

This application is a U.S. Continuation Application of International Application No. PCT/EP2007/007005, filed Aug. 8, 2007, and claims priority under 35 U.S.C. §119 to German Patent Application No. 10 2006 040 109.3, filed Aug. 26, 2006, the entire disclosure of which is expressly incorporated by reference herein.

BACKGROUND AND SUMMARY OF THE INVENTION

The invention relates to an active, divided stabilizer for a motor vehicle having an incorporated pivot motor.

Dividing a motor vehicle stabilizer into a first stabilizer part assigned to the suspension of the left wheel of a vehicle axle and a second stabilizer part assigned to the suspension of the right wheel of this vehicle axle is already known. If these stabilizer parts are pivotable in relation to one another around their shared longitudinal axis, significantly increased roll stability may be achieved in relation to chassis having one-piece roll stabilizers, if a suitable pivot motor is provided between the two stabilizer parts, which pivots these stabilizer parts in relation to one another as needed on the basis of a suitable activation.

A pivot motor comprises at least one motor and a mechanical transmission. A stabilizer is thus obtained whose two stabilizer parts, which are connected to one another by the pivot motor, may be pivoted in relation to one another in a targeted way, so that a desired stabilizer torque is generated, which then prevents the rolling of the vehicle structure. Such a stabilizer is described in German Patent Publication No. DE 198 46 275 A1.

Stabilizers for active roll stabilization thus comprise one or more torsion springs having an incorporated hydraulic, pneumatic, or electromotive actuator. For the implementation of roll stabilization, on the one hand, the guide behavior of the actuator and, on the other hand, the behavior of the system in relation to external interfering influences, are essential for satisfactory function. The influence of an external interfering excitation is to be regulated out actively by the system. This may be performed with a hydraulic actuator, for example, using a pressure regulating valve. The interfering influence is reduced by the equalization of the hydraulic pressure. A proportional valve, which is usable, for example, may operate purely passively, so that no active regulator intervention has to occur.

In electrical roll stabilization systems, as described, for example, in German Patent Publication No. DE 100 02 455 A1, and in German Patent Applications of the applicant having the reference numerals DE 10 2005 031 036 and DE 10 2005 031 037 (no prior publication), an active regulator intervention is necessary for the reduction of the interfering influence. For this purpose, it is necessary to detect the interfering variable using measurement technology. Up to this point, deriving the influence of the interfering variable from the signals of ride height sensors is known. Piezoelements are suggested in German Patent No. DE 197 05 809 C2.

The use of two ride height sensors per axle is preferable for ascertaining the interfering variable influence via ride height sensors. Only in this way may the interfering influence on the stabilizer, which is to be regulated out using the actuator, be ascertained. The detected signals of the sensor are composed of the wheel-related excitation and the oscillation excitation of the body. A complex analysis of the signals to be able to calculate the acting interfering variable results therefrom. Furthermore, high requirements are placed on the precision and resolution of the ride height sensors by the interfering variable ascertainment.

The object of the invention is to avoid these disadvantages as much as possible.

According to the invention, a divided motor vehicle stabilizer having an incorporated pivot motor for roll regulation, which comprises at least one displacement drive made of motor and transmission and one housing, at least one housing part being connected to an associated stabilizer part for torque transmission in such a way that the housing part has an axially oriented, central indentation, into which the stabilizer part extends essentially up to its end, and the connection for torque transmission between the housing part and the stabilizer part associated therewith is located therein, is characterized in that a sensor for detecting the torsion angle of the stabilizer part is attached to the housing part, whose encoder is fixed on the stabilizer part or vice versa.

In an advantageous embodiment of the invention, the sensor delivers measured values which are used to activate the motor, in particular via a control unit. It is particularly advantageous if the control unit ascertains values corresponding to the torsion torque applied to the stabilizer part from the measured values of the sensor.

A further advantageous embodiment of the invention provides that the motor is an electric motor.

An interfering variable acting on the active roll stabilization causes a change of the torque in the passive torsion spring of the stabilizer. A direct detection of the torsion torque may thus be used directly as an input variable for regulating out the interfering variable acting on the actuator. This torsion torque of the passive stabilizer part may be detected using conventional torque sensors, for example, via strain gauges. However, the conventional torque sensors have the disadvantage that they either have too little sensitivity to the engaging torque or are too complex and costly to implement. For this reason, the torque to be detected is ascertained via the torsion angle of the stabilizer.

Greatly varying sensor principles are usable for the angle and/or position detection, namely optical, capacitive, electromagnetic, or ohmic. In particular, inductive position detection may be implemented simply and robustly for the application described here. The position change of the encoder is measured on the basis of the pivot angle caused by the torsion torque of the stabilizer part plunging into the housing.

It is advantageous that the interfering torque is detected directly by detecting the pivot angle directly at the torsion spring of a stabilizer part. The conditioning of the sensor signal may thus be performed simply. The regulator structure may be constructed simply and robustly. Only one sensor is required per axle. Moderate requirements are placed on the sensor in regard to precision and resolution. For this reason, cost-effective sensors may be used. The employed measuring method is a contactless principle, which is to be evaluated as optimal in regard to service life and wear.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIGURE shows a sectional illustration of an electric pivot motor for a motor vehicle stabilizer for pivoting two stabilizer parts in relation to one another, according to an embodiment of the invention.

DETAILED DESCRIPTION

The FIGURE shows a pivot motor for an active stabilizer for a motor vehicle, for coupling two wheels (not shown) of a vehicle axle line. A first stabilizer part 2 is assigned to one wheel and a second stabilizer part 2' is assigned to the other wheel. The two stabilizer parts 2, 2' are coupled by an actuator, implemented as an electric pivot motor, for controlling the lateral inclination of the motor vehicle by tensioning the stabilizer parts 2, 2' in relation to one another. Each stabilizer part 2, 2' extends from an attachment 5, 6 assigned to the pivot motor to an attachment (not shown) assigned to the wheel. The first stabilizer part 2 is fastened to a housing part 1 and a second stabilizer part 2' is fastened to a transmission output element. Fractions of the stabilizer parts 2, 2' are shown in the FIGURE, from which it may be seen that the stabilizer parts 2, 2' are situated coaxially to the pivot motor in the area of the fastening. The torque transmission to the stabilizer parts 2, 2' is performed via a suitable shaft-hub connection, for example, teeth between the housing part 1 and the first stabilizer part 2, and/or between the transmission output element and the second stabilizer part 2'.

The pivot motor is designed in such a way that one housing part 1 has an axially oriented, central indentation 7, into which the associated stabilizer part 2 extends essentially up to its end. The connection for torque transmission, the attachment 6, is located therein between the housing part 1 and the stabilizer part 2 associated therewith. The effective torsion length of the stabilizer part 2 is lengthened in that it is guided into the pivot motor and is first connected there to the attachment 6. The spring rate of the stabilizer part 2 is thus less with identical cross-section and otherwise identical construction than a stabilizer part according to the prior art, which extends in the same way from the attachment assigned to the wheel to an attachment, assigned to the pivot motor, outside the housing part 1.

The electric motor incorporated as a pivot motor in the housing part 1 is designed in such a way that its stator 8 and rotor 9 extend at least partially around the central indentation 7 of the housing part 1, the rotor 9, which is implemented as pot-shaped, being mounted on the central indentation 7 of the housing part 1 via suitable bearings 10, such as friction bearings. The rotor 9 of the electric motor is incorporated in the housing part 1 inside the stator 8, which is connected on its external circumference to the housing part 1 and is implemented as a hollow cylinder. The electric motor may advantageously be an internal-rotor motor in the form of a transverse flux motor. Notwithstanding this, external-rotor motors or radial flux motors are also conceivable. For roll regulation, the electric motor is powered, which then outputs its torque to a pivot motor transmission.

The pivot motor transmission is a two-stage planetary gear 11, whose drive occurs via a sun wheel 13 and whose output occurs via a planet wheel carrier 14, which is connected via the attachment 5 assigned to the pivot motor to the stabilizer part 2'. Teeth of the sun wheel 13 driven by the electric motor are attached, viewed in the longitudinal direction, to one end of the rotor 9, which is mounted as the rotor bearing pin 16, flowing into a further housing part 12. Rotor bearing pin 16, rotor 9, and sun wheel 13 may be implemented in one piece or as multipart.

A sensor 3 for detecting the torsion angle of the stabilizer part 2 is attached to the housing part 1, whose encoder 4 is fixed on the stabilizer part 2. The sensor 3 delivers measured values which are used to activate the electric motor, in particular via a control unit (not shown). The control unit ascertains values corresponding to the torsion torque applied to the stabilizer part 2 from the measured values of the sensor 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A divided motor vehicle stabilizer, comprising:
   a first stabilizer part;
   a second stabilizer part;
   an incorporated pivot motor for roll regulation, the pivot motor including
      at least one displacement drive having a motor, a transmission and a housing,
      at least one housing part of the housing arranged to be connected at a first end to the first stabilizer part for torque transmission and to a second end to the second stabilizer part, the at least one housing part having an axially oriented, central indentation into which the first stabilizer part extends, the central indentation having a connection for torque transmission between the housing part and the first stabilizer part; and
   a sensor for detecting a torsion angle of the first stabilizer part relative to the second stabilizer part, the sensor being directly attached on one of the housing part and the first stabilizer part; and
   an encoder corresponding to the sensor, the encoder being directly fixed on the other of the first stabilizer part and the housing,
   wherein the housing is directly connected to the second stabilizer part such that sensor directly senses the torsion angle between the first and second stabilizer parts.

2. The divided motor vehicle stabilizer according to claim 1, wherein
   the sensor outputs measured values which are used by a control unit to activate the motor.

3. The divided motor vehicle stabilizer according to claim 2, wherein
   the control unit ascertains values corresponding to the torsion torque applied to the first stabilizer part from the measured values of the sensor.

4. The divided motor vehicle stabilizer according to claim 1, wherein
   the motor of the pivot motor is an electric motor.

5. A method of operating a divided motor vehicle stabilizer, the divided motor vehicle stabilizer having a first stabilizer part, a second stabilizer part, an incorporated pivot motor for roll regulation, the pivot motor including at least one displacement drive having a motor, a transmission and a housing and at least one housing part of the housing arranged to be connected to the first stabilizer part for torque transmission, the at least one housing part having an axially oriented, central indentation into which the first stabilizer part extends, the central indentation having a connection for torque transmission between the housing part and the first stabilizer part, wherein a sensor for detecting a torsion angle of the first stabilizer part relative to the second stabilizer part is directly attached on one of the housing part and the first stabilizer part, an encoder corresponding to the sensor is directly fixed on the other of the first stabilizer part and the housing, and the housing is directly connected to the second stabilizer part such that sensor directly senses the torsion angle between the first and second stabilizer parts, the method comprising:

detecting with the sensor a change in the torsion angle between the first stabilizer part and the second stabilizer part;

determining based on the detected change in the torsion angle a desired amount of pivot motor activation in response to the change in the torsion angle; and activating the pivot motor to adjust a torsion torque applied to the first stabilizer part by the pivot motor.

6. The method according to claim 5, wherein the determining step is performed by a control unit.

7. The method according to claim 6, wherein the control unit ascertains values corresponding to the torsion torque applied to the first stabilizer part from the change in the torsion angle determined by the sensor.

8. The method according to claim 5, wherein the motor of the pivot motor is an electric motor.

* * * * *